Dec. 15, 1925.  1,566,208
C. A. HADLEY
ELECTRIC RESISTANCE WELDING
Filed July 8, 1924   2 Sheets-Sheet 1
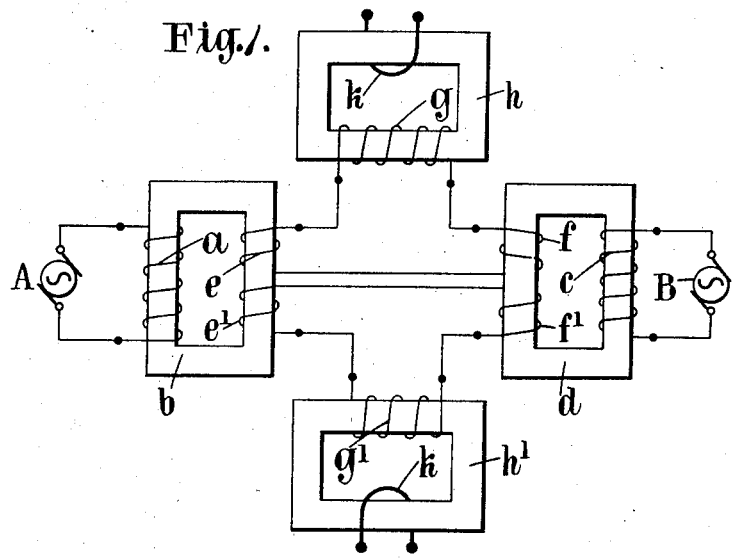
Fig./.
INVENTOR
C. A. Hadley
ATTORNEY

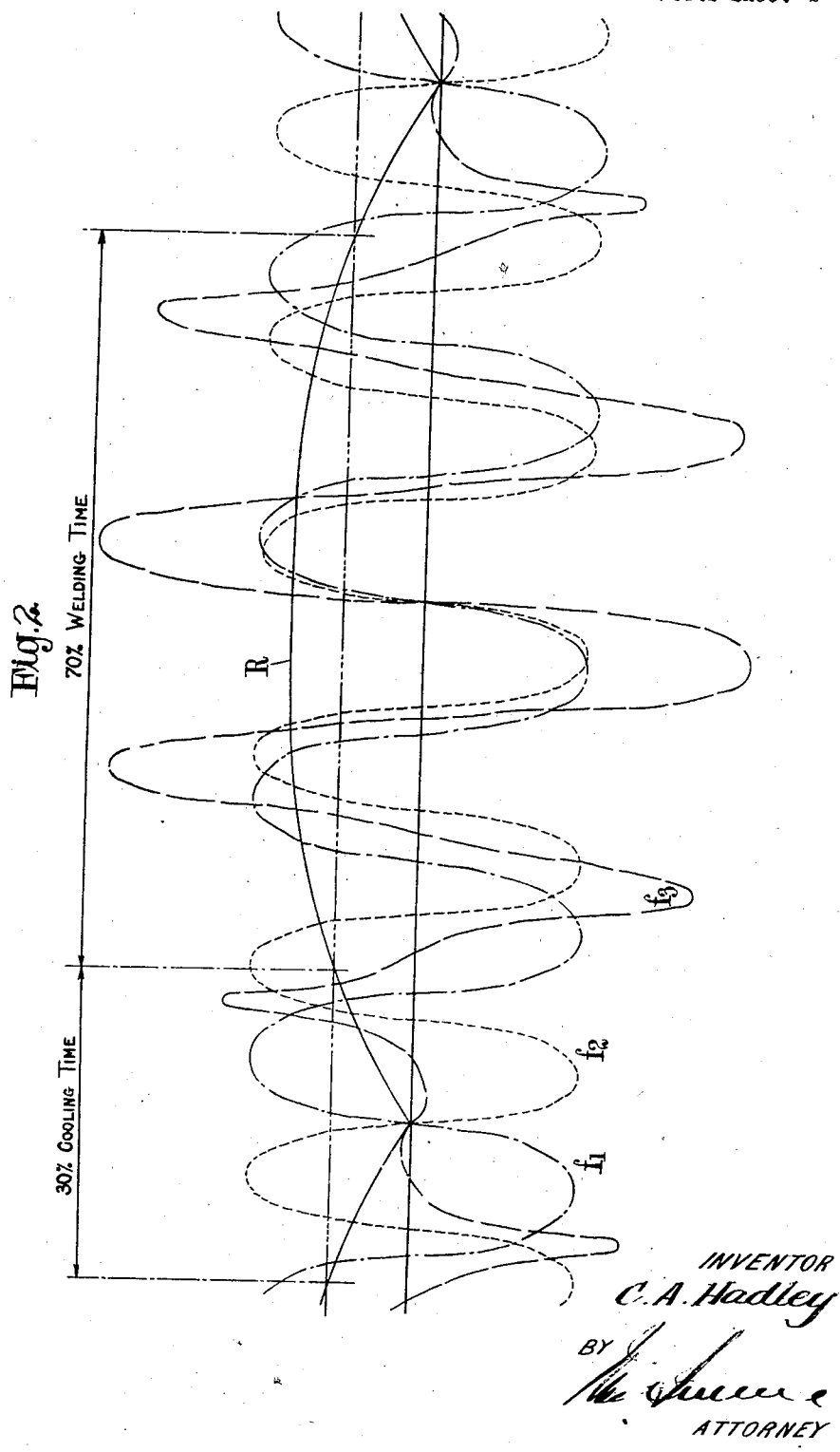

Patented Dec. 15, 1925.

1,566,208

UNITED STATES PATENT OFFICE.

CECIL ALLARTON HADLEY, OF INVERNESS, SCOTLAND.

ELECTRIC RESISTANCE WELDING.

Application filed July 8, 1924. Serial No. 724,901.

*To all whom it may concern:*

Be it known that I, CECIL ALLARTON HADLEY, a British subject, of Island Bank Road, Inverness, Scotland, North Britain, have invented certain new and useful Improvements in Electric Resistance Welding, of which the following is a specification.

This invention relates to electric welding and has for its object the provision of improved means whereby the current may be modulated during the welding operation.

In processes of electric resistance welding and more particularly in the process known as seam or line welding it is well known that it is desirable to interrupt the current supply which is used for heating the parts to be welded or brazed together, the interruption of the current being dependent upon the linear speed of welding, the thickness of the material which is being operated upon, and the area of the surface of the rollers or other electrodes which may be used to conduct the heating current to the parts to be welded or brazed. Hitherto the current has been interrupted by operating a switch in the circuit of the supply mains connected to the primary winding of the transformer used in the welding machine. Such a switch, however, is liable to cause trouble in view of sparking and so forth when a heavy current is required to be switched on and off.

The present invention relates to an improved method by means of which the welding current is fluctuated or modulated in intensity instead of being interrupted.

This method is based upon the heterodynamic or interference beat principle based on the physical laws of superimposed waves.

According to the present invention a compound alternating current is supplied to the welding means, this compound alternating current being obtained by superimposing alternating currents from a number of sources of supply. For this purpose a number of single phase alternators, which are identical in construction, are preferably employed as the sources of supply, the current from these sources of supply being passed through primary windings of one or more transformers of which the secondary windings are in series so that the various currents will be superposed in the circuit which includes the secondary windings.

In order that the invention may be clearly understood it will now be described by way of example with reference to the accompanying drawings, wherein:

Fig. 1 shows an arrangement wherein two heterodyne transformers are arranged for the simultaneous operation of two welding machines.

Fig. 2 shows a diagram of the current curves.

In the drawing, one alternator A is connected to the primary winding $a$ of a static transformer $b$, while the second alternator B is connected to the primary winding $c$ of a second static transformer $d$. The transformers $b$ and $d$ are of the same constructions and the secondary windings $e$, $f$, of the said transformers are identical with each other and with the primary windings $a$ and $c$, and are arranged in series with the primary winding $g$ of a welding transformer $h$, the secondary winding of which is indicated at $k$.

As two welding machines are contemplated, there is provided for the second welding machine a second transformer $h'$, and the primary winding $g'$ of this transformer is arranged in series with additional primary windings $e'$, $f'$ on the transformers $b$ and $d$. The secondary winding of the transformer $h'$ is indicated at $k'$. The secondary windings $e'$, $f'$ are identical with each other and with the secondary windings $e$, $f$. In this arrangement the windings $e$, $f$ and $e'$, $f'$ respectively are arranged in opposition so that while, for example, the transformer $h$ is supplying its maximum current, the transformer $h'$ is supplying its minimum current, and vice versa.

The operation of the arrangements above described employing two single phase alternators A, B of identical construction will now be described with reference to the diagram Fig. 2.

The alternator A is driven at a speed to produce an alternating current having a frequency $f_1$ cycles per second at a voltage $V_1$. The alternator B, however, may be driven at any desired speed so that its frequency $f_2$ may be equal to any value between $f_1 + x$ to $f_1 - x$, whilst its voltage is regulated so that it will always be substantially equal to the voltage $V_1$ of the alternator A. The resultant obtained by superposing the two alternating currents is indicated by the curve $f_3$ in Fig. 2.

Now assuming that both alternators are being driven at the same speed and are running in phase, the frequencies $f_1$ and $f_2$ will be equal. The voltages $V_1$ and $V_2$ will also be equal in value and magnitude as long as the alternators are driven in synchronism. Under these circumstances the current flowing through the welding circuit will be equal to the voltage $V_1 + V_2$ divided by the impedance of this circuit.

If the connections of one of the secondary windings to the welding circuit were reversed the voltage induced in this secondary winding would be equal to the voltage in the other secondary winding, but in the opposite direction, so that no current would flow in the welding circuit. In other words, the voltage in the welding circuit would be $V_1 - V_2 = 0$, so that no current flows in said circuit.

Referring again to the first method of connections and assuming that the speed of alternator B is increased so that its frequency $f_2 = f_1 + x$ and its voltage is adjusted so that $V_1 = V_2$ then the voltage in the welding circuit will alternate between values $V_1 + V_2 = 2V_1$ and $V_1 - V_2 = 0$. If a curve is drawn through the mean values of the voltages it will vary from a maximum to zero at a frequency equal to $f_2 - f_1 = x$, although the mean values of the separate voltages $V_1$ and $V_2$ remain constant.

By superposing the two alternating currents the period of cooling and welding during each cycle will be substantially as indicated by the curve R in Fig. 2, 70% of each cycle being the period of welding and 30% the period of cooling.

It may be mentioned in general that the power input to the primary of each transformer varies in proportion to the value of the supply voltage. A considerable difference between the two voltages does not appear to affect its heterodynamic effect in the welding circuit, but the power factor is adversely affected and for this reason it is usual to employ voltages of substantially equal value.

In some cases, however, it may be desirable to use unequal voltages, as, for example, where one supply is taken from an outside source and the second supply has to be generated by an auxiliary plant such as a motor-driven alternator. In such a case it is obvious that it is desirable to make the auxiliary plant as small as possible and this may be done by suitably arranging the respective voltages.

As a practical example of the application of the invention to spot welding with a current varying in intensity with a periodicity of two per second, an electrical supply of say 50 and 48 cycles per second would be passed through the two primary windings of a two-phase transformer so as to produce 2 cycles per second in the external circuit of the two secondary windings. The material to be treated would be fed through the machine at a speed of 5 feet per minute, that is 1" per second, and with the above periodicity 2 spot welds would be produced per inch. To form a continuous spot weld the periodicity would either be increased or the speed of feed reduced so that one spot weld would overlap the preceding one, the speed of feed or periodicity being adjusted according to the nature of the weld to be produced. It will thus be seen that by the use of a welding system according to the present invention it is possible at will to obtain a wide range in the time factor in a simple manner, whilst the welding current is modulated or fluctuated without the necessity of breaking the continuity of the circuit.

What I claim is:—

1. An electric resistance welding system comprising a plurality of transformers, a plurality of primary windings, one on each of said transformers, and a plurality of sources of supply of alternating current connected one to each primary winding, a plurality of sets of secondary windings on the transformers with the windings of each set arranged in series, the winding of the respective sets on one transformer being in the relatively same direction and the windings of the respective sets on the other transformer being in the relatively opposite direction, and a plurality of welding means each including a winding connected to one of the sets of secondary windings.

2. An electric resistance welding system comprising a plurality of transformers, a plurality of primary windings, one on each of said transformers, and a plurality of sources of supply of alternating current connected one to each primary winding, a plurality of sets of secondary windings on the transformers with the windings of each set arranged in series, the winding of the respective sets on one transformer being in the relatively same direction and the winding of the respective sets on the other transformer being in the relatively opposite direction, and a plurality of welding means each including a winding, one set of such secondary windings being opposed to the second set of such secondary windings, whereby when one welding means is receiving maximum current the other is receiving minimum current.

3. An electric resistance welding system comprising a plurality of transformers, a plurality of primary windings, one on each of said transformers, and a plurality of sources of supply of alternating current connected one to each primary winding, a plurality of sets of secondary windings on the transformers with the windings of each set arranged in series, the winding of the respective sets on one transformer being in the relatively same direction and the windings of the respective sets on the other transformer being in the relatively opposite direction and a plurality of welding means each including a winding connected to one of the sets of secondary windings in series.

4. An electric resistance welding system comprising a plurality of transformers, a plurality of primary windings, one on each of said transformers, and a plurality of sources of supply of alternating current connected one to each primary winding, a plurality of sets of secondary windings on the transformers with the windings of each set arranged in series, the winding of the respective sets on one transformer being in the relatively same direction and the windings of the respective sets on the other transformer being in the relatively opposite direction and a plurality of welding means each including a winding connected to one of the sets of secondary windings in series, one set of such secondary windings being opposed to the second set of such secondary windings, whereby when one welding means is receiving maximum current the other is receiving minimum current.

In testimony whereof I have signed my name to this specification.

CECIL ALLARTON HADLEY.